Nov. 8, 1927.   1,648,353
H. LEACH
DIRECTION INDICATOR FOR MOTOR VEHICLES
Filed May 11, 1926   2 Sheets-Sheet 1
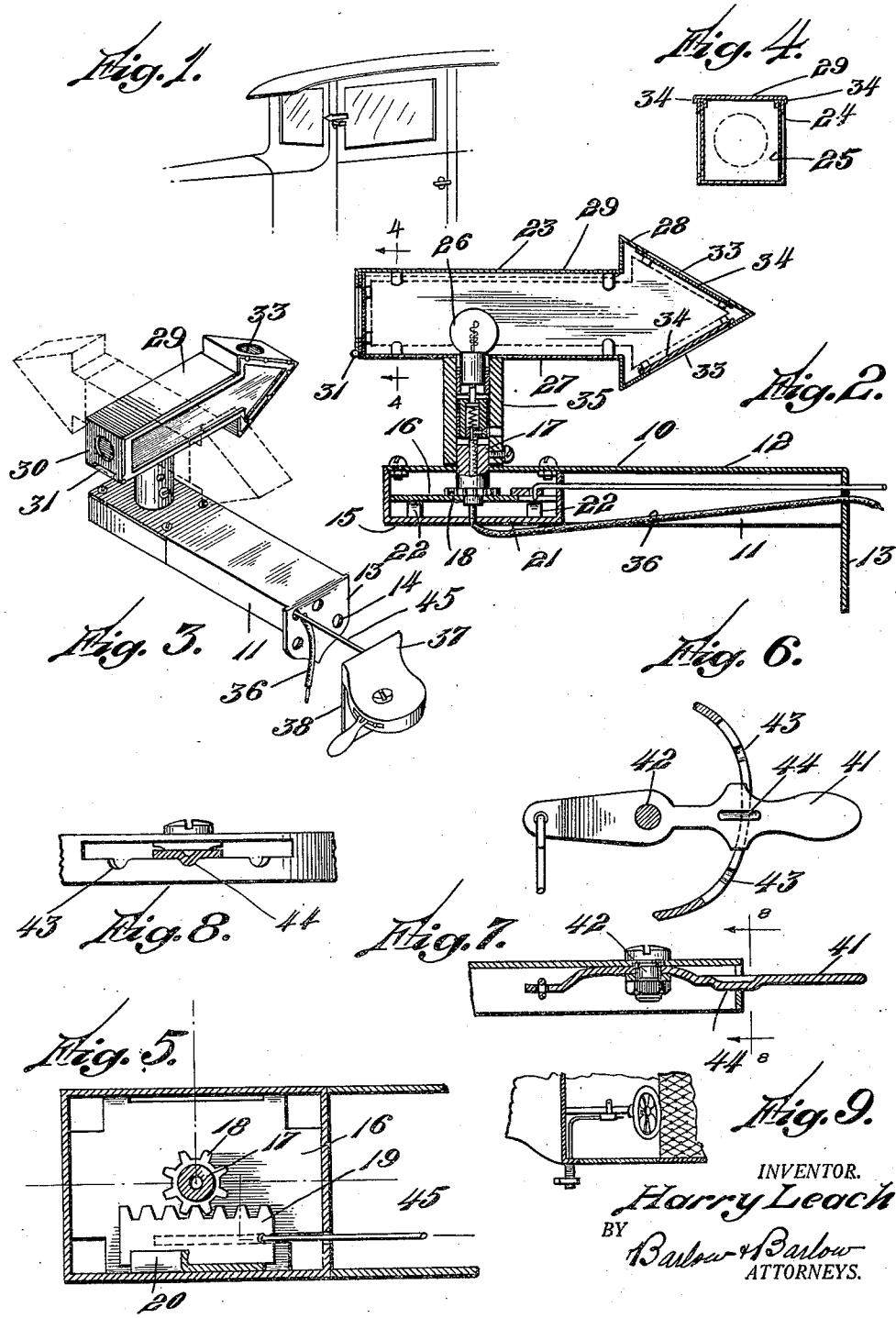
INVENTOR.
Harry Leach
BY
Barlow & Barlow
ATTORNEYS.

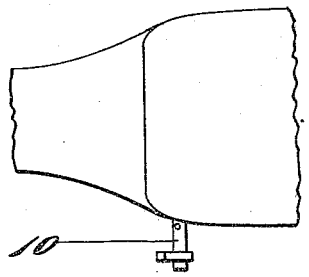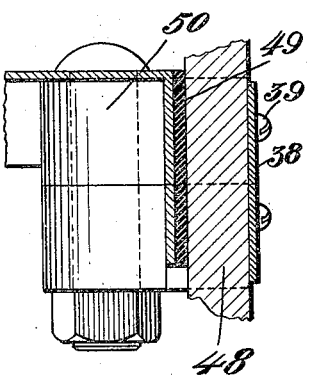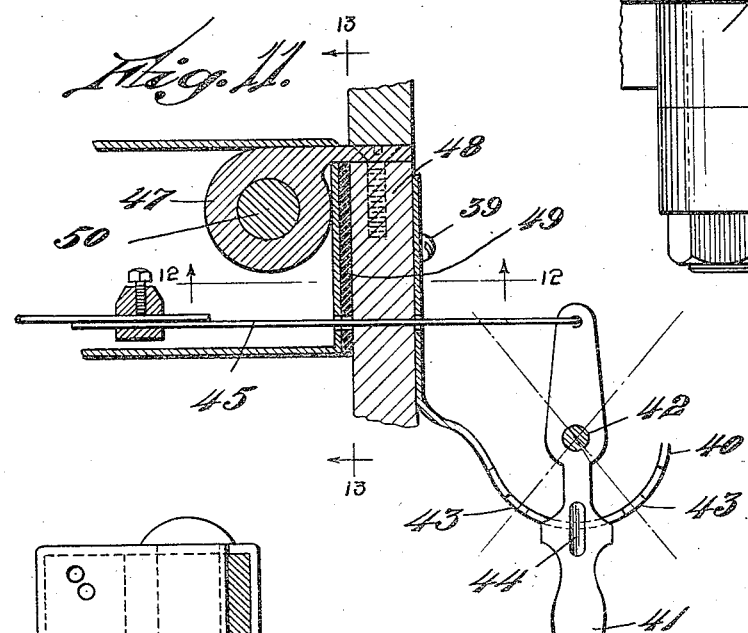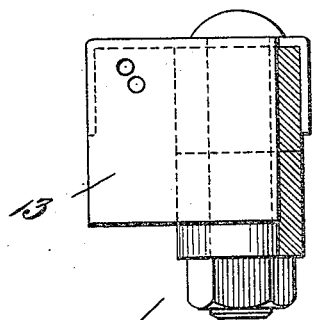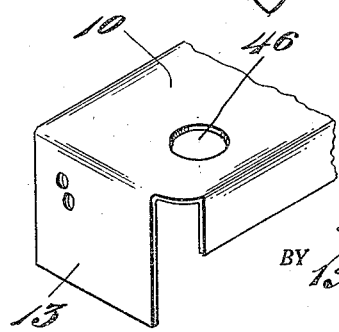

Patented Nov. 8, 1927.

1,648,353

UNITED STATES PATENT OFFICE.

HARRY LEACH, OF PROVIDENCE, RHODE ISLAND.

DIRECTION INDICATOR FOR MOTOR VEHICLES.

Application filed May 11, 1926. Serial No. 108,289.

This invention relates to an improved construction of direction indicator for motor vehicles; and the object of this invention is to provide such an indicator which is simple and practical in its construction and which may be readily attached to the outside of a vehicle and operated from a point within the vehicle, having simple and practical mechanism for swinging or rotating the pointer on its supporting arm to indicate to the traffic officer the direction the vehicle is about to take.

A further object of the invention is to provide a shaft on the pointer member extending into a hollow supporting arm, the end of the shaft being provided with a pinion and an endways movable rack being meshed with the pinion whereby a movement of the rack will cause the pointer to rotate.

A further object of the invention is the provision of an operating handle adapted to be attached to a part of the vehicle at a distance from the indicator proper to be connected to an indicator, the handle being provided with detent mechanism whereby it is releasably retained in different adjusted positions to securely retain the pointer in whatever indicating position it is set.

A still further object of the invention is the provision of simple and effective means whereby the indicator supporting arm may be readily attached to the door hinge portion of a motor vehicle to swing the door.

With these and other objects in view, the invention consists of certain novel features of construction, as will be more fully described, and particularly pointed out in the appended claims.

In the accompanying drawings:

Figure 1 is a perspective view showing my improved indicating device as applied to the outside of a closed vehicle.

Figure 2 is an enlarged sectional elevation of my improved indicating device.

Figure 3 is a perspective view of the indicating device showing the pointer in dotted lines as swung to different direction indicating positions.

Figure 4 is a section on line 4—4 of Figure 2 through the direction pointer.

Figure 5 is a sectional top view showing the pinion on the end of the pointer shaft and the operating rack engaging the pinion.

Figure 6 is a top view partly in section showing the indicator operating arm.

Figure 7 is a sectional side elevation showing a portion of the bracket carrying this operating arm.

Figure 8 is a rear end view of the bracket showing the operating arm mounted therein, the opening in the bracket being notched to receive protuberances on the arm to releasably retain the same in different adjusted positions.

Figure 9 is a fragmental view of a motor vehicle showing my improved direction indicator as mounted on the outside thereof and the operating lever as supported on the steering post.

Figure 10 is a top view showing a fragmental portion of the vehicle with my improved direction indicator as secured to the hinge member of the door.

Figure 11 is a sectional top view illustrating the supporting arm as secured in position to the hinge member of the door.

Figure 12 shows the hinge bolt as passing through an opening in the arm and a downturned end of the arm as being secured adjacent the face of the door with a flexible cushioning member between the end of the arm and the door to support the arm in position on the hinge.

Figure 13 is a rear end view of the supporting arm and showing the same as applied to the door hinge.

Figure 14 is a fragmental view of the supporting arm showing the hole through the top wall thereof for the reception of the hinge pin.

It is found in the construction and operation of direction indicators for motor vehicles, of advantage to provide a device which is strong and durable and which may be easily operated; also to provide a supporting arm for the pointer which may be readily attached to the different portions of the vehicle particularly one which may be readily attached to the outside of a closed vehicle and to provide means which may be attached in any convenient place inside of the vehicle within easy reach of the driver by which the pointer may be operated. To accomplish this in a simple and effective way, I have provided one means for attaching the pointer supporting arm to the outside of the vehicle which is that of forming a downturned lip on the end of this arm which is adapted to set against the door and to provide cushioning means between this downturned end and the body of the door;

also to form a hole in the top plate of the arm whereby the pivot pin of the hinge may be forced down through this hole to serve, in addition to its function as a pivot pin, also as a bolt for securely retaining the supporting arm in position against the door to swing therewith; also it is found of advantage to provide a bracket for the operating handle which may be secured to the inner surface of the door to support the handle within easy reach of the operator of the car; and to provide on this handle means for releasably retaining it, and the pointer to which it is connected, in different adjusted positions; and the following is a detailed description of the present embodiment of my invention and showing one construction by which these advantageous results may be accomplished:—

With reference to the drawings, 10 designates the supporting arm of my improved direction indicator, which arm is preferably made of sheet stock having its side walls 11 folded downwardly and providing a main top wall 12 on which the pointer member is supported, the inner end 13 of this arm being turned downwardly to provide a support for the arm which end flange in some instances is provided with holes 14 for suitable fastening screws, while in other instances, this surface may be bound against the outer surface of the door to support the arm rigidly in fixed position as will be presently described.

The outer end of this arm is provided with an inclosing portion 15 having a deck 16 upon which the lower end of the pointer shaft 17 may rest. A pinion 18 being secured to the lower end of this shaft which is arranged to be engaged by an endways slidable rack 19, the rack being supported on this deck 16 and retained in position by the lip 20 of the deck which is turned over its outer edge. This deck is preferably supported in spaced relation to the bottom wall 21 of the box-shaped end by inwardly-turned spacer fingers 22 which are cut from the corners of the deck plate and bent downwardly therefrom.

The pointer member 23 which is operatively supported on this arm is provided with a body portion formed of a metal frame. The sides of which are cut out as at 24 and to cover which cutout sides I have inserted a transparent or translucent material 25 such as ground glass, celluloid or other suitable material which may be colored red or have other attractive coloring, so that when the lamp 26, which is mounted in this hollow pointer member, will illuminate the same and shine through these colored side walls to attract the attention of the traffic officer.

The body of this pointer member is preferably formed from a strip of sheet metal which is folded to form a bottom wall 27 and an enlarged head portion 28. The top body plate 29 is provided with a downwardly-extending end plate 30 which is hinged at 31 to the lower body plate, whereby this top plate may be swung back to open up the pointer body to permit the ready insertion or removal of the lamp 26 and then snapped back into position to be retained by the binding of the side edge flanges 34 over the upper edges of the side walls.

The walls in the head end of the pointer have openings 33 therein over which the transparent colored members 34 are positioned and through which the light may shine to indicate to the traffic officer in which direction the head portion is pointing.

This pointer member is provided with a tubular supporting standard 35 in which the shaft 17 is fixed, which shaft I provide with a central hole through which the current is supplied to the lamp in the pointer member through the wire 36.

In order to provide a suitable operating handle for actuating this pointer, I have formed a bracket 37 having a side wall 38 having screw holes therein to receive the fastening screws 39 by which it may be secured in position on the inside of the vehicle. This bracket is provided with an arcuately-shaped portion 40 in which the operating handle 41 is pivoted at 42. The edge of this arcuately-shaped member is notched at 43 and the handle is provided with a protuberance 44 whereby when swung on its pivot to engage any one of the three notches 43 it is releasably retained in any of its set positions, and as this handle is connected to the rack 19 through the connector member 45, its swinging motion serves to impart an endwise movement to this rack to act through the pinion 18 and rotate the pointer to any of its indicating positions.

In some instances it is found to be of advantage to connect the supporting arm to the door hinge of the vehicle and to this end I have provided a hole 46 through the top wall of this arm and the downturned end portion or flange 13 thereof is in some cases adapted to pass between the hinge lug 47 and the door 48 of the vehicle in which case I preferably insert a strip of flexible material 49 such as felt, rubber or the like, between the flange and the door to support the end of the arm, and in this case I insert the hinge pivot pin 50 of the door, through this hole 46 which serves the double purpose of securing the arm and also that of providing a pivot pin for the hinge. This construction is best illustrated in Figure 11. Where I attach this arm to the outside of the door to swing with it, I preferably attach the bracket of the operating handle on the inside of the door, as best illustrated in Figure 11 so that the whole mechanism will swing with the door and at the same time the handle will be in easy reach of the operator of the car.

By my construction I have provided a very simple and practical direction indicating device which may be readily attached to the outside of a motor vehicle and which may be operated from the inside of the vehicle.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination with a vehicle body having a door hinged to it, of a direction indicator for the vehicle, comprising a supporting arm having a down turned end flange to abut against the outside of the door, a hole adjacent one end of the arm to receive the hinge pivot to bind the arm against the door to swing therewith, a pointer rotatably mounted on said arm and an operating handle mounted on the inside of the door and operatively connected with said pointer, and detent mechanism for releasably retaining said handle and pointer in different adjusted positions.

2. In combination with a vehicle body having a door hinged to the body, of a direction indicator for the vehicle, comprising a supporting arm having a hole adjacent one end thereof to receive the hinge pivot pin and having a portion abutting the door causing the arm to swing with the door, a rotatable pointer mounted on said arm, means for illuminating said pointer, and an operating handle mounted on the inside of the door and connected to said pointer to actuate the same.

In testimony whereof I affix my signature.

HARRY LEACH.